United States Patent
Bobo et al.

(10) Patent No.: US 7,238,008 B2
(45) Date of Patent: Jul. 3, 2007

(54) TURBINE BLADE RETAINER SEAL

(75) Inventors: Melvin Bobo, deceased, late of Falls Church, VA (US); by Beatrice Louise Bobo, legal representative, Falls Church, VA (US); Lawrence Wayne Plemmons, deceased, late of Hamilton, OH (US); by Helen Marie Plemmons, legal representative, Hamilton, OH (US); Maureen Theresa Normoyle, Mauldin, SC (US); Robert Joseph Albers, Union, KY (US); William Lee Herron, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 394 days.

(21) Appl. No.: 10/857,521

(22) Filed: May 28, 2004

(65) Prior Publication Data

US 2005/0265849 A1 Dec. 1, 2005

(51) Int. Cl.
*F01D 5/32* (2006.01)
(52) U.S. Cl. .................................. 416/220 R
(58) Field of Classification Search ............ 416/219 R, 416/220 R, 221, 248, 193 A, 95, 96 R, 97 R; 415/173.7, 174.5
See application file for complete search history.

(56) References Cited

U.S. PATENT DOCUMENTS

| | | | |
|---|---|---|---|
| 3,635,586 A | 1/1972 | Kent et al. | |
| 3,709,631 A | 1/1973 | Karstensen et al. | |
| 3,814,539 A | 6/1974 | Klompas | |
| 4,192,633 A | 3/1980 | Herzner | |
| 4,304,523 A | 12/1981 | Corsmeier et al. | |
| 4,484,858 A | 11/1984 | Kurosawa et al. | |
| 4,507,052 A | 3/1985 | Thompson | |
| 4,701,105 A | 10/1987 | Cantor et al. | |
| 4,803,893 A | 2/1989 | Bachinski | |
| 4,854,821 A | 8/1989 | Kernon et al. | |
| 4,890,981 A | 1/1990 | Corsmeier et al. | |

(Continued)

FOREIGN PATENT DOCUMENTS

EP 1 439 282 A1 7/2004

(Continued)

OTHER PUBLICATIONS

Search Report, Oct. 12 and 13, 2005, 4 pages.

*Primary Examiner*—Ninh H. Nguyen
(74) *Attorney, Agent, or Firm*—William Scott Andes; Steven J. Rosen (57) ABSTRACT

An annular blade retention plate for axially retaining rotor blades within slots of a rotor disk. The plate includes an annular plate web extending radially outwardly from a radially inner plate hub to a plate rim and an annular radially outwardly open outer channel in a radially outwardly facing outer surface of the rim. A sealing ring is received within the outer channel and the sealing ring has axial rectangularly shaped cross-sections. An annular axially forwardly open inner channel in an annular ridge on a forward plate face of the plate web has an annular seal wire received therein. In a rotor assembly having a rotor disk supporting a plurality of circumferentially spaced apart rotor blades mounted in corresponding axially extending slots and the plate mounted to the rotor disk the sealing ring is in sealing engagement with radially inwardly facing surfaces of blade platforms of the blades.

36 Claims, 5 Drawing Sheets

U.S. PATENT DOCUMENTS

| | | |
|---|---|---|
| 5,052,893 A | 10/1991 | Catte |
| 5,211,536 A | 5/1993 | Ackerman et al. |
| 5,257,909 A | 11/1993 | Glynn et al. |
| 5,302,086 A * | 4/1994 | Kulesa et al. ............... 416/221 |
| 5,445,499 A * | 8/1995 | Charbonnel ............ 416/220 R |
| 5,622,475 A | 4/1997 | Hayner et al. |
| 5,733,103 A * | 3/1998 | Wallace et al. ............. 416/248 |
| 5,957,660 A * | 9/1999 | Evans et al. .............. 416/97 R |
| 6,077,035 A | 6/2000 | Walters et al. |
| 6,095,750 A | 8/2000 | Ross et al. |
| 6,106,234 A | 8/2000 | Gabbitas |
| 6,129,193 A * | 10/2000 | Link ......................... 192/84.1 |
| 6,375,429 B1 | 4/2002 | Halila et al. |
| 6,506,016 B1 | 1/2003 | Wang |
| 6,520,743 B2 * | 2/2003 | Arilla et al. ............ 416/220 R |
| 6,558,121 B2 | 5/2003 | Zhu et al. |
| 6,575,703 B2 | 6/2003 | Simeone et al. |
| 6,672,832 B2 | 1/2004 | Leeke et al. |
| 7,040,866 B2 * | 5/2006 | Gagner ................... 416/220 R |
| 2004/0191067 A1 | 9/2004 | Phipps et al. |

FOREIGN PATENT DOCUMENTS

| | | | |
|---|---|---|---|
| FR | 2324873 | 4/1977 | |
| GB | 2095763 A * | 10/1982 | ............. 416/220 R |
| GB | 2 226 367 A | 6/1990 | |
| GB | 2 274 688 A | 8/1994 | |
| GB | 2 286 431 A | 8/1995 | |
| GB | 2 332 024 A | 6/1999 | |

* cited by examiner

TURBINE BLADE RETAINER SEAL

BACKGROUND OF THE INVENTION

1. Field of the Invention

The invention relates to gas turbine engine turbine disk assemblies and, more particularly, to blade retainers or side plates used to axially retain blades mounted in slots in the disk and their seals to reduce cooling air from leaking into the hot turbine flowpath gas stream.

2. Description of Related Art

Gas turbine engines have a compressor and turbine which each include one or more annular rows of axially spaced fixed stator vanes which are positioned between rows of rotatable rotor blades. Each turbine blade has an airfoil portion, a platform portion and a root or dovetail portion which is mounted into a corresponding, axial slot formed in the rim of a turbine disk. The connection between the dovetail or root of the rotor blade and the axial slot in the disk rim prevents radial and tangential movement of each rotor blade relative to the disk.

Blade retainers, also referred to as side plates, are used to axially secure the turbine blades in the corresponding slots of the disk rim. The blade retainer also seals cooling air directed radially through disk and into the slots and through the blade shanks for cooling the turbine blades. Typically, the cooling air is compressor discharge pressure (CDP) air which has been routed around the combustor in order to internally cool high pressure turbine blades and vanes. The purpose of CDP air is to provide film cooling for airfoil surfaces directly in the path of these hot flowpath gases with maximum efficiency and minimum wastage of the cooling air potential since the turbine hardware is unable to withstand the hot gas temperature exiting the combustor without such protection. Lack of or improperly designed seals increase the cooling air requirements and allows the cooling air to enter the flowpath of the combustor gases.

Axial sealing between the blade retainer and the disk rim and blade roots to prevent blade cooling air from escaping the disk assembly is well known. Axial sealing, with or without wire annular seals for close clearances between the blade retainer, the blades and the disk rim have been found to allow cooling air losses because the sealing wire has imperfect contact with the blade and blade retainer. Other types of blade retainers such as shown in U.S. Pat. No. 4,890,981 issued to Corsmeier, et al., allowed the radial outer portion of the retainer to rest against the shank of the blade at an axial position without benefit of an additional sealing means at this point. Contact between the two materials existed during engine assembly; however, a small gap would form during engine operation due to different thermal gradients which would allow shank blade cooling air to escape into the aft blade cavity.

SUMMARY OF THE INVENTION

An annular blade retention plate for at least partially axially retaining rotor blades within slots of a rotor disk includes an annular plate web extending radially outwardly from a radially inner plate hub to a plate rim and an annular radially outwardly open outer channel in a radially outwardly facing outer surface of the rim. An exemplary embodiment of the plate includes a sealing ring received within the outer channel and the sealing ring and having axial rectangularly shaped cross-sections. An annular axially forwardly open inner channel in an annular ridge on a forward plate face of the plate web has an annular seal wire received therein. The plate may further include a radially outer axially extending flange.

In a rotor assembly having a rotor disk supporting a plurality of circumferentially spaced apart rotor blades mounted in corresponding axially extending slots and the plate mounted to the disk the sealing ring is in sealing engagement with radially inwardly facing surfaces of blade platforms of the blades. The rotor assembly may be part of a turbine assembly which includes a nozzle axially aft and downstream of and adjacent to the rotor assembly. A discourager seal may be located radially outwardly of an aft cavity axially located between the nozzle axially aft and the rotor assembly.

The turbine nozzle includes a plurality of circumferentially spaced apart stator vanes extending radially outwardly from a stator platform and an axially forwardly extending radially outer stator platform flange spaced apart from and radially outwardly of an axially forwardly extending radially inner stator flange. The rotor blades include aftwardly extending platform flanges of the blade platforms. One exemplary embodiment of the discourager seal includes the aftwardly extending platform flanges radially disposed between the radially outer stator platform flange and the radially inner stator flange. Another exemplary embodiment of the discourager seal includes the axially aftwardly extending flange of the plate radially disposed between the inner stator flange and the outer stator platform flange.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
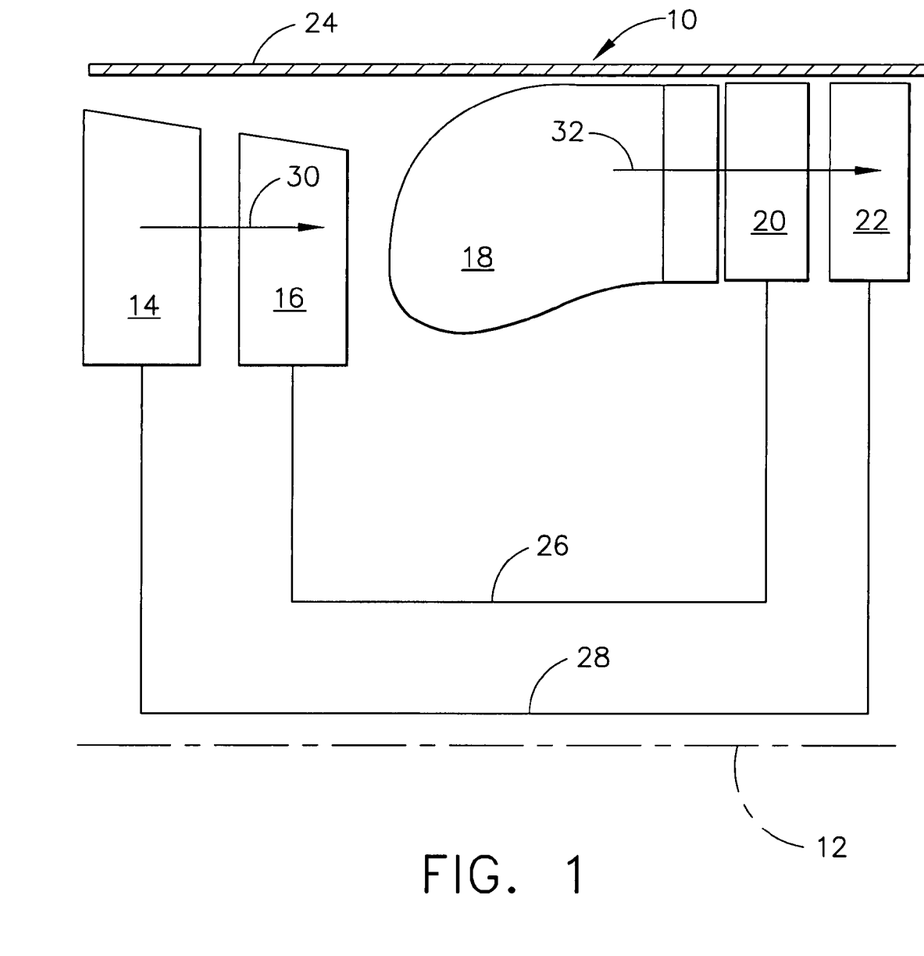
FIG. 1 is a longitudinal schematical view illustration of a gas turbine engine.

Illustrated schematically in FIG. 1 is an exemplary aircraft gas turbine engine 10 which includes in serial flow communication about a longitudinal or axial centerline axis 12, a fan or low pressure compressor (LPC) 14, a high pressure compressor (HPC) 16, a combustor 18, and a high pressure turbine (HPT) 20, all of which are conventional in structure and operation. Disposed downstream of the HPT 20 is a low pressure turbine (LPT) 22 in accordance with an exemplary embodiment of the present invention. The HPC 16 is drivenly connected to the HPT 20 by a first drive shaft 26 and the fan is drivenly connected to the LPT 22 by a second drive shaft 28. Ambient air is compressed in turn in the fan and HPC 16 to provide compressed air 30 to the combustor 18 wherein it is conventionally mixed with fuel and ignited for generating hot combustion gases 32 which flow downstream in turn through a hot gaspath 24 of the HPT 20 and the LPT 22 which extract energy therefrom for driving the compressors 14 and 16.

Figure 2:
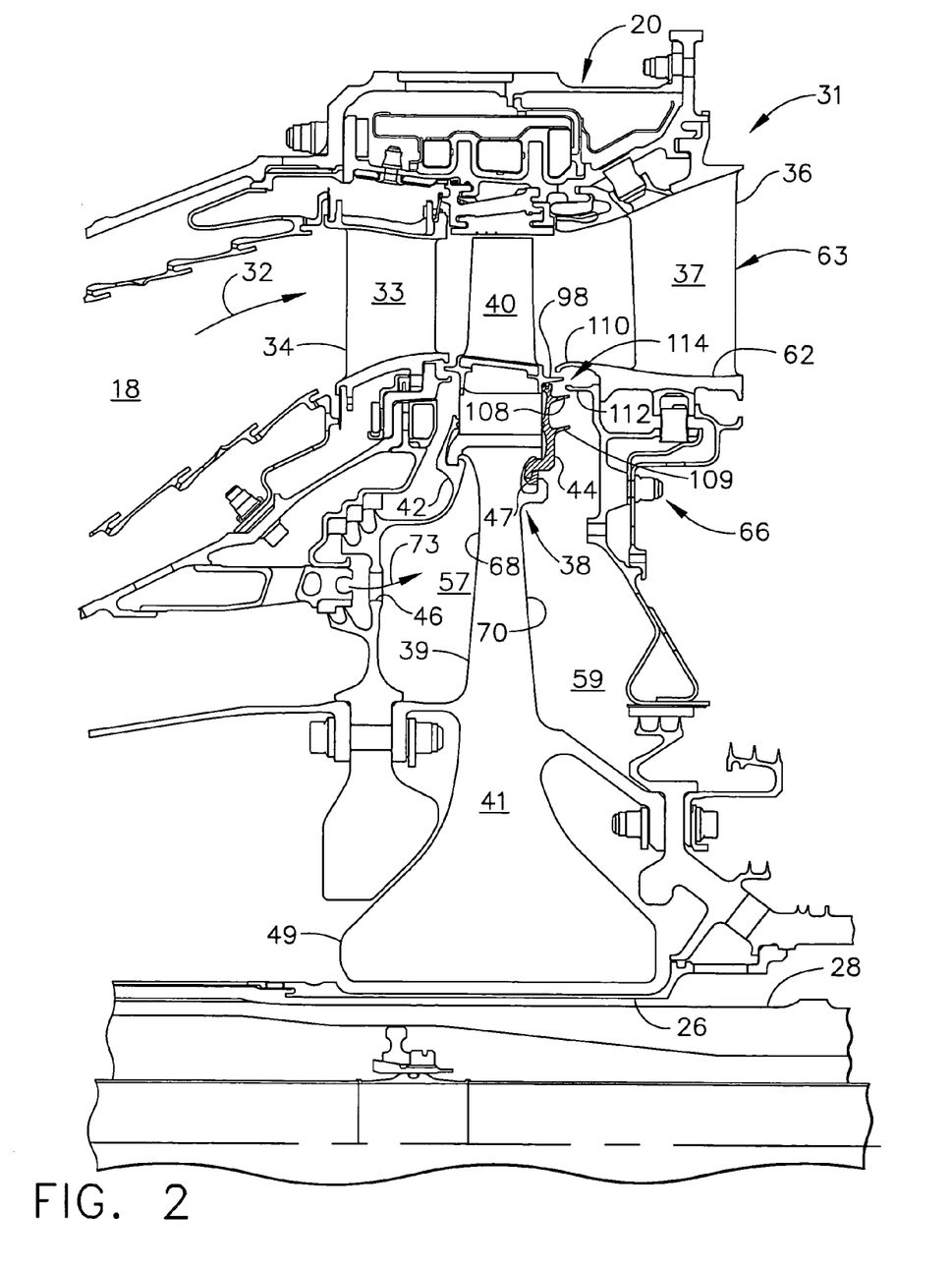
FIG. 2 is a longitudinal sectional view illustration of a gas turbine engine turbine stage of the gas turbine engine illustrated in FIG. 1, including a blade retainer with a radially outwardly open groove and sealing ring therein.

Illustrated in FIG. 2 is a turbine assembly 31 exemplified by the high pressure turbine (HPT) 20 which includes a first turbine nozzle 34 having a plurality of circumferentially spaced apart first stator vanes 33 which direct the combustion gases 32 downstream to an axially adjacent rotor assembly 38 of the HPT 20, which in turn flows the combustion gases 32 into a second turbine nozzle 36 axially aft and downstream of and adjacent to the rotor assembly 38. The second turbine nozzle 36 includes a plurality of circumferentially spaced apart second stator vanes 37 extending radially outwardly from a stator platform 62 of a segmented annular vane assembly 63. Extending radially inwardly from the stator platform 62 is a stator hub 66 which helps support the segmented vane assembly 63. The rotor assembly 38 includes a rotor disk 39 supporting a plurality of circumferentially spaced apart rotor blades 40 at least partially axially retained therein by an annular first or forward blade retention plate 42 and an annular opposite second or aft blade retention plate 44. The forward blade retention plate 42 is bolted to an axially forward side 68 of the disk 39 and axially secures the forward plate 42 against the disk 39. The aft blade retention plate 44 is mounted against an axially aft side 70 of the disk 39 and secured thereto by a second split locking ring 47. The forward and aft blade retention plates 42 and 44 are used to axially retain the rotor blades 40.

Figure 3:
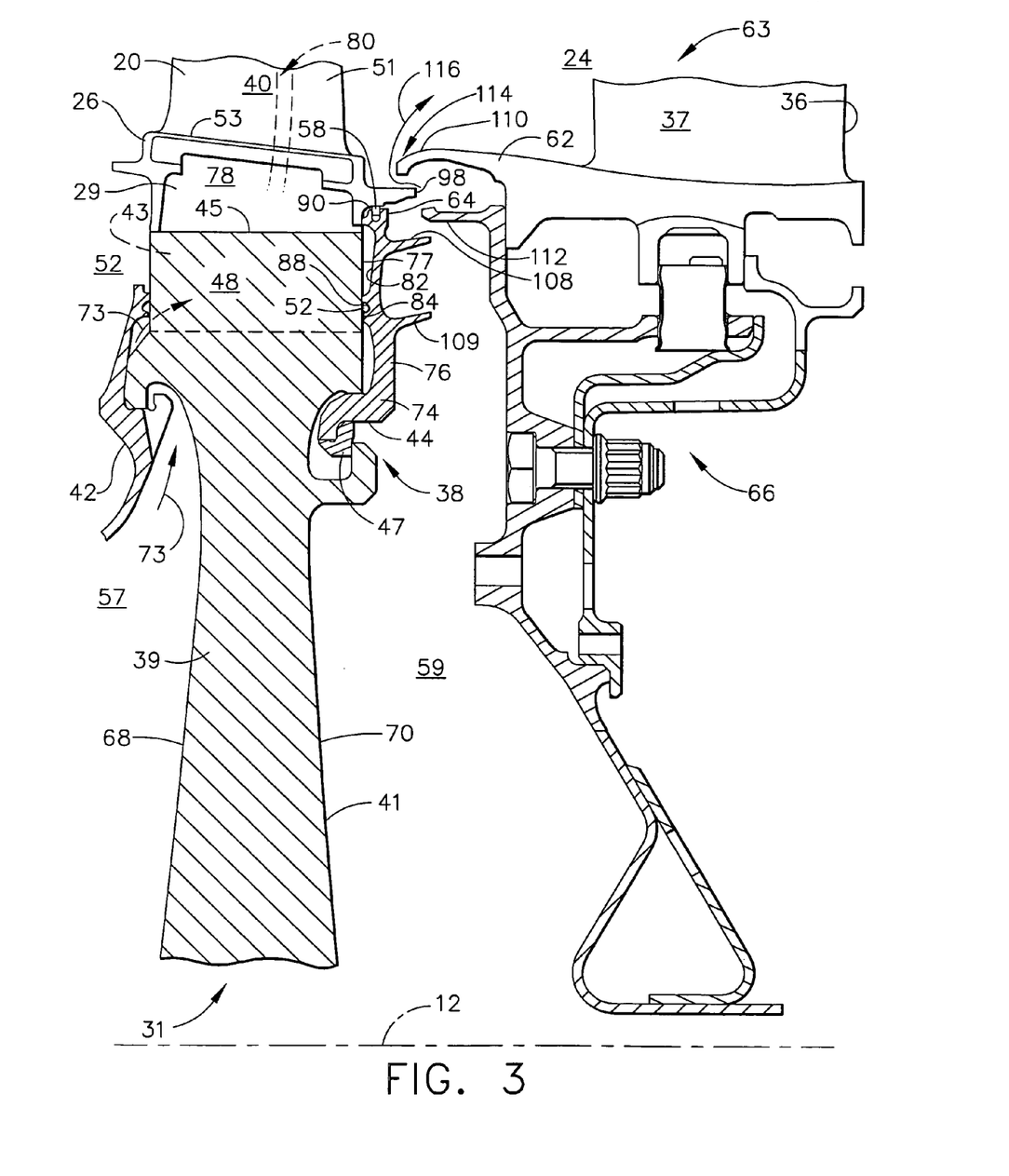
FIG. 3 is an enlarged sectional view illustration of the blade retainer and discourager seal of the turbine stage illustrated in FIG. 2.

Referring to FIGS. 2 and 3, the disk 39 includes a radially outer disk rim 48 which is integrally joined to a radially inner hub 49 (illustrated in FIG. 2) by a narrower annular web 41 extending radially therebetween. The outer disk rim 48 includes a plurality of circumferentially spaced apart axially extending dovetail slots 43 which open radially outwardly. Each of the blades 40 include a dovetail root 45 extending radially inwardly from a blade platform 53 and an airfoil 51 extending radially outwardly from the blade platform 53. The blade dovetail roots 45 are complementary to and axially disposed in respective ones of the dovetail slots 43 for radially retaining the blades 40 to the disk 39. Cooling air 73 from the compressor is fed to a rotating forward cavity 57 between the forward blade retention plate 42 and the disk 39 through holes 46 in the forward blade retention plate 42. The cooling air 73 is fed from the forward cavity 57 through the dovetail slots 43 to inlets 78 in the dovetail root 45 leading to a cooling circuit 80 in the airfoil 51. The aft blade retention plate 44 is also used to prevent the hot combustion gases 32 flowing through the turbine from flowing into the dovetail slots 43 thereby reducing the cooling of airfoil 51 by the cooling air 73.

The aft blade retention plate 44 includes an annular plate web 76 extending radially outwardly from and integrally joined or formed with a radially inner plate hub 74 to a plate rim 64. The annular plate web 76 includes an annular axially forwardly open inner channel 88 in an annular ridge 84 on the forward plate face 82 of the plate web 76. An annular seal wire 52 is received within the inner channel 88 for sealing against an aft face 77 of the outer disk rim 48. The annular plate web 76 is configured to allow the annular ridge 84 to abut the aft face 77 of the outer disk rim 48 and the blade dovetail roots 45 for axially retaining the blades 40 in the slots 43 of the outer disk rim 48 on the aft side thereof. This configuration also helps seal the slots 43 with the annular seal wire 52 in the inner channel 88 in the annular ridge 84 on the forward plate face 82 of the plate web 76.

Figure 5:
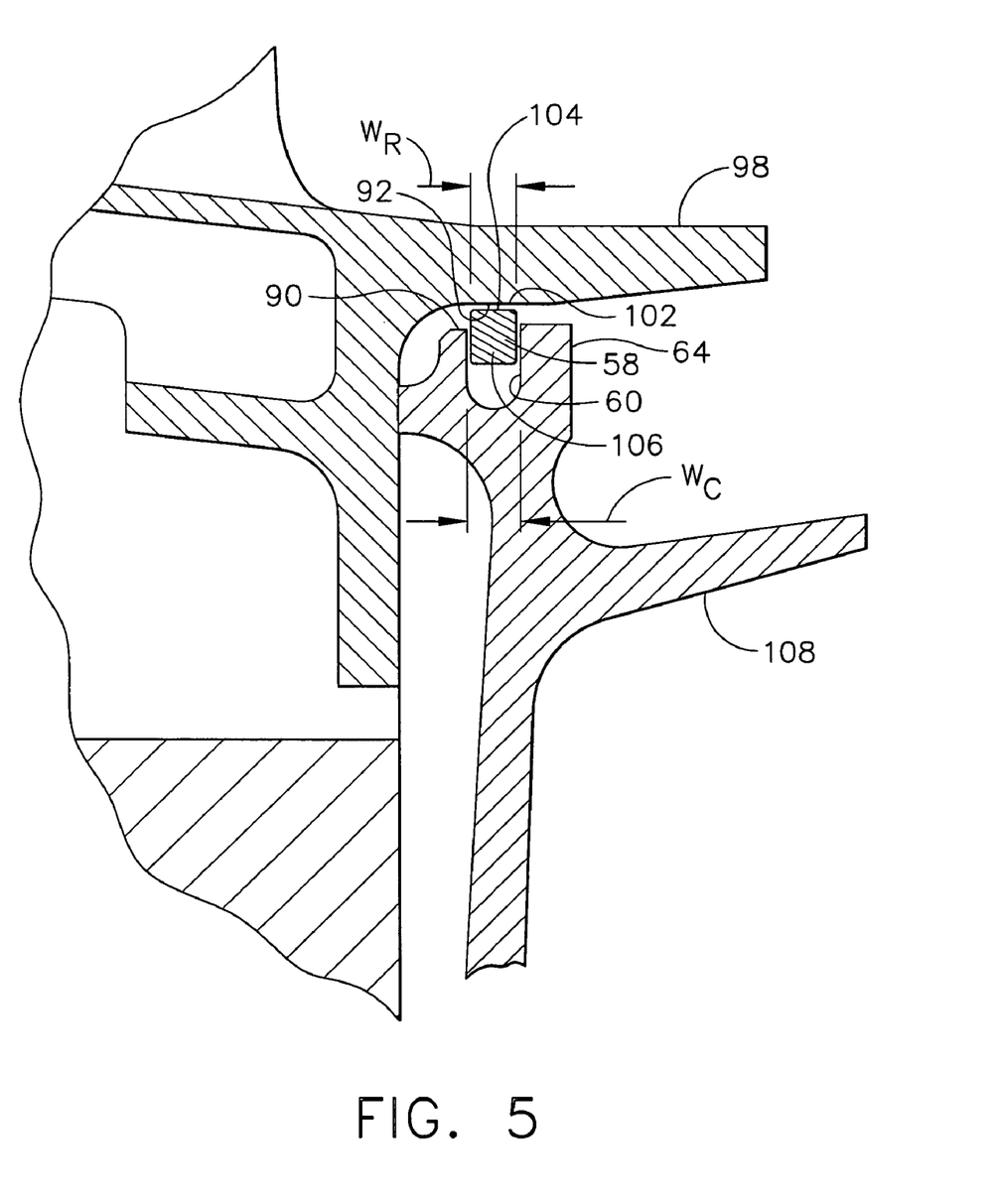
FIG. 5 is an enlarged view of a portion of the blade retainer with the radially outwardly open groove and sealing ring illustrated in FIG. 3.

Referring to FIGS. 3 and 5, a sealing ring 58 is received within an annular radially outwardly open outer channel 60 in a radially outwardly facing outer surface 90 of the plate rim 64. The sealing ring 58 seals against radially inwardly facing surfaces 92 of aftwardly extending platform flanges 98 of the blade platforms 53. Cooling air 73 from the compressor is also fed to an aft cavity 59 axially located between the rotor disk 39 of rotor assembly 38 and the second turbine nozzle 36. This sealing arrangement helps to prevent or suppress cooling air 73 from escaping from the dovetail slots 43 into the aft cavity 59 instead of flowing into the inlets 78 in the dovetail root 45 and on into the cooling circuit 80 in the airfoils 51.

The sealing ring 58 illustrated herein is shaped to conform to the shape of the radially inwardly facing surface 92 of the platform flange 98 where it makes contact during engine operation. A substantially conically or cylindrically shaped contact portion 102 of the radially inwardly facing surface 92 should conform to the shape of a radially outwardly facing ring surface 104 of the sealing ring 58. The sealing ring 58 can have an axial rectangularly-shaped cross-section 106 or a more particular square-shaped cross-section such as that of a piston ring. The outer channel 60 is also illustrated as having a corresponding axial rectangularly-shaped cross-section 106 or a more particular square-shaped cross-section. The sealing ring 58 grows radially outwardly to contact and seal against the radially inwardly facing surface 92 of the platform flange 98 due to centrifugal forces exerted on the sealing ring 58 during engine operation. The sealing ring 58 and the aft blade retention plate 44 should be made of the same or similar materials such that the differences in coefficient of thermal expansion is minimal and a ring axial width WR of the sealing ring 58 can be designed to closely match a channel axial width WC of the outer channel 60 of the aft blade retention plate 44.

Reduced relative motion at engine non-operation temperatures permits the utilization of a relatively shallow circumferential outer channel 60 while minimizing the possibility that the sealing ring 58 will become unseated due to its angular corners and flat and cylindrical surfaces. The walls surrounding the outer channel 60 are thus shorter and thinner which allows the aft blade retention plate 44 to be lighter in weight than conventional blade retainers and retention plates. A rectangular cross-sectional sealing ring 58 effectively seals the gap between the radially inwardly facing surface 92 of the platform flange 98 and the aft blade retention plate 44. The rectangular cross-sectional sealing ring 58 provides a greater amount of bearing surface contact which results in less pressure between the radially inwardly facing surface 92 of the platform flange 98 and the radially outwardly facing ring surface 104 of the sealing ring 58 so that there is less wear on the sealing ring 58. The rectangular cross-sectional sealing ring 58 provides better distribution of centrifugal forces for a given load by increasing the load effective area and, thereby, improving the reliability of such an assembly.

The second turbine nozzle 36 includes an axially forwardly extending radially outer stator platform flange 110 of the stator platform 62 spaced apart from and radially outwardly of an axially forwardly extending radially inner stator flange 112 of the stator hub 66. The platform flange 98 of the blade platform 53 is radially disposed between the radially outer stator platform flange 110 and the radially inner stator flange 112 to provide a discourager or discourager seal 114 radially outwardly of the aft cavity 59. The discourager seal 114 further includes the inner stator flange 112 radially disposed between a radially outer axially aftwardly extending flange 108 of the aft blade retention plate 44 and the platform flange 98. The discourager seal 114 is used to discourage airflow between the aft cavity 59 and the hot gaspath 24 containing the hot combustion gases 32 between the rotor assembly 38 and the second turbine nozzle 36. This prevents ingestion of some of the hot combustion gases 32 into the relatively cool aft cavity 59 during engine transients when pressure in the hot gaspath 24 may briefly exceed pressure in the aft cavity 59. Note that the stator platform flange 110 is positioned radially outwardly of and radially overlapping the aftwardly extending flange 108 of the aft blade retention plate 44 thus directing aft cavity purge airflow 116 leaking out of the aft cavity 59 in an aftwardly or downstream direction 118.

Figure 4:
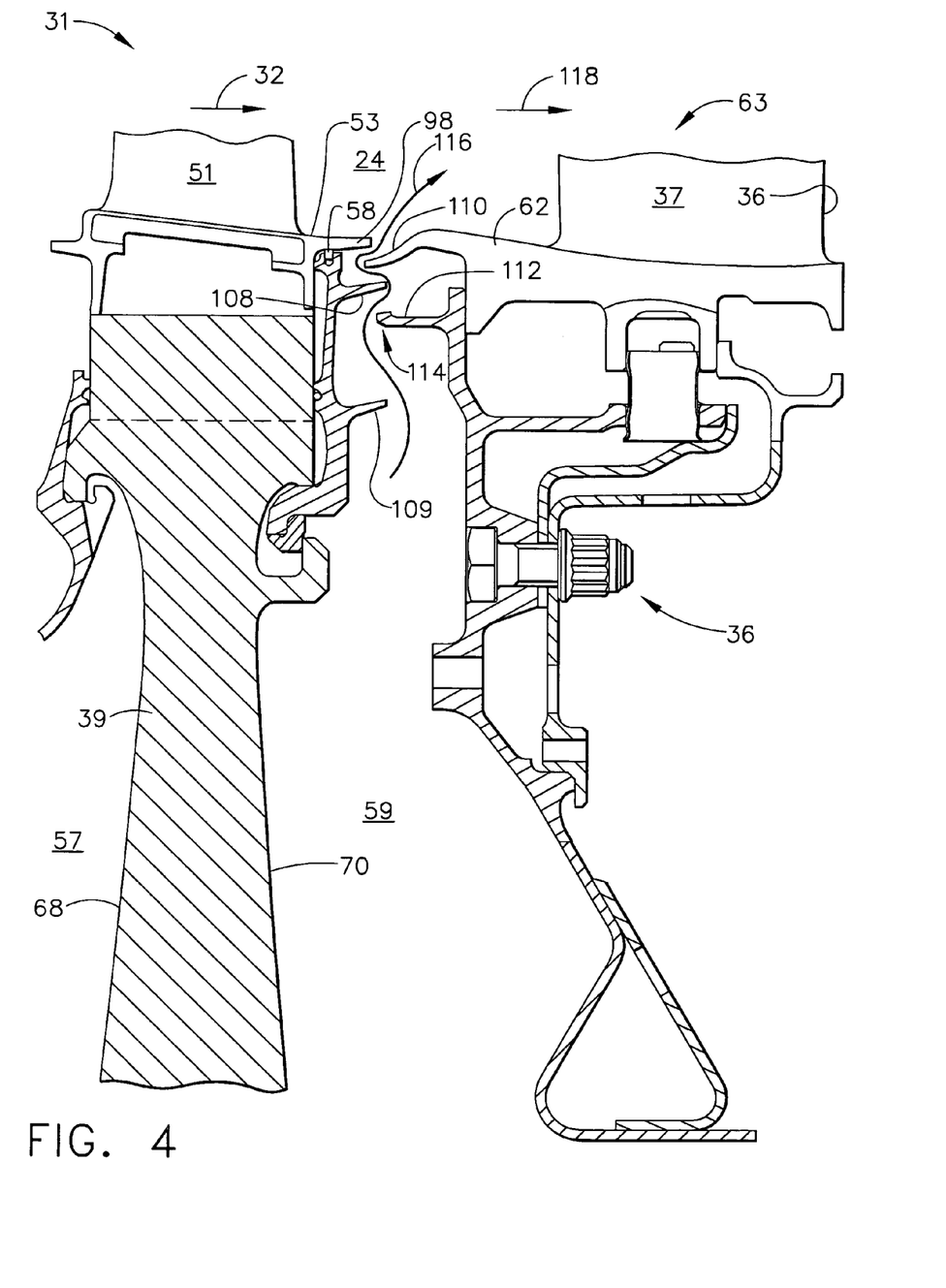
FIG. 4 is a longitudinal sectional view illustration of an alternative embodiment of the discourager seal illustrated in FIG. 3.

An alternative arrangement of the flanges of the discourager seal 114 is illustrated in FIG. 4. In the embodiment of the discourager seal 114 illustrated in FIG. 4 the outer stator platform flange 110 is radially disposed between platform flange 98 and the aftwardly extending flange 108 of the aft blade retention plate 44. The discourager seal 114 further includes the axially aftwardly extending flange 108 radially disposed between the inner stator flange 112 and the outer stator platform flange 110. This arrangement of the flanges causes the aft cavity purge airflow 116 to flow in the downstream direction 118 of flow of the hot gases in the hot gaspath 24 as it exits between the stator platform flange 110 and the aftwardly extending flange 108. Both embodiments of the discourager seal 114, illustrated in FIGS. 3 and 4, further include an axially aftwardly extending radially inner flange 109 of the aft blade retention plate 44 located radially inwardly of both the axially aftwardly extending flange 108 and the inner stator flange 112.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. An annular blade retention plate comprising:
an annular plate web extending radially outwardly from a radially inner plate hub to a plate rim,
an annular radially outwardly open outer channel in a radially outwardly facing outer surface of the place rim,
a sealing ring received within the outer channel,
the sealing ring and the outer channel having axial rectangularly shaped cross-sections, and
the sealing ring and the blade retention plate being made of same or similar materials having same or about same coefficients of thermal expansion respectively.

2. An annular blade retention plate as claimed in claim 1 further comprising the outer channel having an axial width closely matched with a ring axial width of the sealing ring.

3. An annular blade retention plate comprising:
an annular plate web extending radially outwardly from a radially inner plate hub to a plate rim,
an annular radially outwardly open outer channel in a radially outwardly facing outer surface of the plate rim, and
an annular axially forwardly open inner channel in an annular ridge on a forward plate face of the plate web and an annular seal wire received within the inner channel.

4. An annular blade retention plate as claimed in claim 3 further comprising the outer channel having an axial rectangularly shaped cross-section.

5. An annular blade retention plate as claimed in claim 3 further comprising a sealing ring received within the outer channel.

6. An annular blade retention plate as claimed in claim 5 further comprising the outer channel and the sealing ring having axial rectangularly shaped cross-sections.

7. An annular blade retention plate comprising:
an annular plate web extending radially outwardly from a radially inner plate hub to a plate rim,
an annular axially forwardly open inner channel in an annular ridge on a forward plate face of the plate web,
an annular radially outwardly open outer channel in a radially outwardly facing outer surface of the plate rim, and
a radially outer and axially extending flange on the plate web.

8. An annular blade retention plate as claimed in claim 7 further comprising the outer channel having an axial rectangularly shaped cross-section.

9. An annular blade retention plate as claimed in claim 7 further comprising a sealing ring received within the outer channel.

10. An annular blade retention plate as claimed in claim 9 further comprising the outer channel and the sealing ring having axial rectangularly shaped cross-sections.

11. An annular blade retention plate as claimed in claim 7 further comprising an annular seal wire received within the inner channel.

12. An annular blade retention plate as claimed in claim 11 further comprising the outer channel having an axial rectangularly shaped cross-section.

13. An annular blade retention plate as claimed in claim 12 further comprising a sealing ring received within the outer channel.

14. An annular blade retention plate as claimed in claim 13 further comprising the sealing ring having axial rectangularly shaped cross-section.

15. A rotor assembly comprising:
a rotor disk supporting a plurality of circumferentially spaced apart rotor blades mounted in corresponding axially extending slots in a radially outer disk rim of the rotor disk,
an annular blade retention plate mounted to the rotor disk, the annular blade retention plate at least partially axially retaining the rotor blades within the slots,
the annular blade retention plate including an annular plate web extending radially outwardly from a radially inner plate hub to a plate rim and an annular radially outwardly open outer channel in a radially outwardly facing outer surface of the plate rim, and
an annular axially forwardly open inner channel in an annular ridge on a forward plate face of the plate web and an annular seal wire received within the inner channel and in sealing engagement with an aft face of the outer disk rim.

16. A rotor assembly as claimed in claim 15 further comprising the outer channel having an axial rectangularly shaped cross-section.

17. A rotor assembly as claimed in claim 15 further comprising airfoils extending radially outwardly from blade platforms of the blades and a sealing ring received within the outer channel and in sealing engagement with radially inwardly facing surfaces of the blade platforms.

18. A rotor assembly as claimed in claim 17 further comprising the outer channel and the sealing ring having axial rectangularly shaped cross-sections.

19. A rotor assembly comprising:
a rotor disk supporting a plurality of circumferentially spaced apart rotor blades mounted in corresponding axially extending slots in a radially outer disk rim of the rotor disk,
an annular blade retention plate mounted to the rotor disk, the annular blade retention plate at least partially axially retaining the rotor blades within the slots,
the annular blade retention plate including an annular plate web extending radially outwardly from a radially inner plate hub to a plate rim and an annular radially outwardly open outer channel in a radially outwardly facing outer surface of the plate rim, and
a radially outer axially extending flange of the blade retention plate.

20. A rotor assembly as claimed in claim 19 further comprising airfoils extending radially outwardly from blade platforms of the blades and a sealing ring received within the outer channel and in sealing engagement with radially inwardly facing surfaces of the blade platforms.

21. A rotor assembly as claimed in claim 20 further comprising the outer channel and the sealing ring having axial rectangularly shaped cross-sections.

22. A rotor assembly as claimed in claim 21 further comprising an annular axially forwardly open inner channel in an annular ridge on a forward plate face of the plate web and an annular seal wire received within the inner channel and in sealing engagement with an aft face of the outer disk rim.

23. A turbine assembly comprising:
a turbine nozzle axially aft and downstream of and adjacent to a rotor assembly,
the rotor assembly including a rotor disk supporting a plurality of circumferentially spaced apart rotor blades mounted in corresponding axially extending slots in a radially outer disk rim of the rotor disk,
an annular aft blade retention plate mounted against an axially aft side of the rotor disk, the annular blade retention plate at least partially axially retaining the rotor blades within the slots,
the annular blade retention plate including an annular plate web extending radially outwardly from a radially inner plate hub to a plate rim,
an annular radially outwardly open outer channel in a radially outwardly facing outer surface of the plate rim,
an annular axially forwardly open inner channel in an annular ridge on a forward plate face of the plate web and an annular seal wire received within the inner channel and in sealing engagement with an aft face of the outer disk rim, and
airfoils extending radially outwardly from blade platforms of the blades and a sealing ring received within the outer channel and in sealing engagement with radially inwardly facing surfaces of the blade platforms.

24. A turbine assembly as claimed in claim 23 further comprising the outer channel and the sealing ring having axial rectangularly shaped cross-sections.

25. A turbine assembly as claimed in claim 23 further comprising an aft cavity axially located between the turbine nozzle and the rotor assembly.

26. A turbine assembly comprising:
a turbine nozzle axially aft and downstream of and adjacent to a rotor assembly,
the rotor assembly including a rotor disk supporting a plurality of circumferentially spaced apart rotor blades mounted in corresponding axially extending slots in a radially outer disk rim of the rotor disk,
an annular blade retention plate mounted against, an axially aft side of the rotor disk and at least partially axially retaining the rotor blades within the slots,
the annular blade retention plate including an annular plate web extending radially outwardly from a radially inner plate hub to a plate rim and an annular radially outwardly open outer channel in a radially outwardly facing outer surface of the plate rim,
a sealing ring received within the outer channel and in sealing engagement with radially inwardly facing surfaces of the blade platforms, and
a radially outer flange axially extending away from the annular plate web of the blade retention plate.

27. A turbine assembly comprising:
a turbine nozzle axially aft and downstream of and adjacent to a rotor assembly,
an aft cavity axially located between the turbine nozzle and the rotor assembly,
the rotor assembly including a rotor disk supporting a plurality of circumferentially spaced apart rotor blades mounted in corresponding axially extending slots in a radially outer disk rim of the rotor disk,
an annular aft blade retention plate mounted against an axially aft side of the rotor disk,
the annular blade retention plate at least partially axially retaining the rotor blades within the slots,
the annular blade retention plate including an annular plate web extending radially outwardly from a radially inner plate hub to a plate rim,
an annular radially outwardly open outer channel in a radially outwardly facing outer surface of the plate rim,
a sealing ring received within the outer channel and in sealing engagement with radially inwardly facing surfaces of the blade platforms, and
a discourager seal located radially outwardly of the aft cavity.

28. A turbine assembly as claimed in claim 27 further comprising:
aftwardly extending platform flanges of the blade platforms,
the turbine nozzle including a plurality of circumferentially spaced apart stator vanes extending radially outwardly from a stator platform,
the turbine nozzle including an axially forwardly extending radially outer stator platform flange spaced apart from and radially outwardly of an axially forwardly extending radially inner stator flange, and
the discourager seal including the platform flanges radially disposed between the radially outer stator platform flange and the radially inner stator flange.

29. A turbine assembly as claimed in claim 28 further comprising the outer channel and the sealing ring having axial rectangularly shaped cross-sections.

30. A turbine assembly as claimed in claim 29 further comprising an annular axially forwardly open inner channel in an annular ridge on a forward plate face of the plate web and an annular seal wire received within the inner channel and in sealing engagement with an aft face of the outer disk rim.

31. A turbine assembly as claimed in claim 27 further comprising:
aftwardly extending platform flanges of the blade platforms,
the turbine nozzle including a plurality of circumferentially spaced apart stator vanes extending radially outwardly from a stator platform,
the turbine nozzle including an axially forwardly extending radially outer stator platform flange spaced apart from and radially outwardly of an axially forwardly extending radially inner stator flange, and
the discourager seal including the axially at aftwardly extending flange radially disposed between the inner stator flange and the outer stator platform flange.

32. A turbine assembly as claimed in claim 31 further comprising the outer channel and the sealing ring having axial rectangularly shaped cross-sections.

33. A turbine assembly as claimed in claim 32 further comprising an annular axially forwardly open inner channel in an annular ridge on a forward place face of the plate web and an annular seal wire received within the inner channel and in sealing engagement with an aft face of the. outer disk rim.

34. A turbine assembly comprising:
a turbine nozzle axially aft and downstream of and adjacent to a rotor assembly,
an aft cavity axially located between the turbine nozzle and the rotor assembly,
the rotor assembly including a rotor disk supporting a plurality of circumferentially spaced apart rotor blades mounted in corresponding axially extending slots in a radially outer disk rim of the rotor disk,
an annular aft blade retention plate mounted against an axially aft side of the rotor disk,
the annular blade retention plate at least partially axially retaining the rotor blades within the slots,
the annular blade retention plate including an annular plate web extending radially outwardly from a radially inner plate hub to a plate rim,
an annular radially outwardly open outer channel in a radially outwardly facing outer surface of the plate rim,
a sealing ring received within the outer channel and in sealing engagement with radially inwardly facing surfaces of the blade platforms,
the sealing ring and the outer channel having axial rectangularly shaped cross-sections, and
the sealing ring and the blade retention plate being made of same or similar materials having same or about same coefficients of thermal expansion respectively.

35. A turbine assembly as claimed in claim 34 further comprising an annular axially forwardly open inner channel in an annular ridge on a forward plate face of the plate web and an annular seal wire received within the inner channel.

36. A turbine assembly as claimed in claim 35 further comprising a discourager seal located radially outwardly of the aft cavity.

* * * * *